US008234988B2

(12) United States Patent
Zielke et al.

(10) Patent No.: US 8,234,988 B2
(45) Date of Patent: Aug. 7, 2012

(54) SEED DISPENSER CONTROL

(75) Inventors: Roger Zielke, Huxley, IA (US); Will Cannon, Newton, IA (US); Ryan Witt, Huxley, IA (US); Tom Irwin, Bloomfield, IA (US)

(73) Assignee: Ag Leader Technology

( * ) Notice: Subject to any disclaimer, the term of this patent is extended or adjusted under 35 U.S.C. 154(b) by 18 days.

(21) Appl. No.: 12/626,000

(22) Filed: Nov. 25, 2009

(65) Prior Publication Data

US 2010/0131095 A1    May 27, 2010

Related U.S. Application Data

(60) Provisional application No. 61/118,312, filed on Nov. 26, 2008.

(51) Int. Cl.
| | |
|---|---|
| A01C 7/00 | (2006.01) |
| A01C 9/00 | (2006.01) |
| A01C 15/00 | (2006.01) |
| B65G 59/04 | (2006.01) |
| B65H 3/08 | (2006.01) |

(52) U.S. Cl. .......... 111/185; 111/200; 221/211
(58) Field of Classification Search ............ 111/34, 111/77, 174, 177, 179, 183–185, 200; 221/211, 221/278
See application file for complete search history.

(56) References Cited

U.S. PATENT DOCUMENTS

| | | | |
|---|---|---|---|
| 4,091,964 | A | 5/1978 | Harrer |
| 4,241,849 | A | 12/1980 | Harrer |
| 4,872,785 | A | 10/1989 | Schrage et al. |
| 5,431,117 | A | 7/1995 | Steffens et al. |
| 6,758,153 | B1 | 7/2004 | Hagen et al. |
| 2002/0170476 | A1 | 11/2002 | Bogner et al. |
| 2003/0116068 | A1 | 6/2003 | Sauder et al. |
| 2008/0250993 | A1 | 10/2008 | Mariman et al. |

*Primary Examiner* — Christopher J. Novosad
(74) *Attorney, Agent, or Firm* — Davis Brown Law Firm; Kent A. Herink

(57) ABSTRACT

Control apparatus for a pneumatic seed meter having a seed disc that uses a pneumatic pressure differential to hold and release seed on a rotating disc. The control apparatus is controlled to disrupt the pressure differential in an area of the rotating disc to selectively disrupt planting of seed by the seed meter to, for example, reduce overlap planting.

6 Claims, 6 Drawing Sheets

SEED DISPENSER CONTROL

This application claims priority to U.S. Patent Application Ser. No. 61/118,312, filed Nov. 26, 2008, and incorporated herein by this reference.

BACKGROUND OF THE INVENTION

The invention relates generally to controls for seed planters and, more specifically, to a control element that is manipulated to control the dispensing of seed from a pneumatic seed meter.

In many parts of the world row crops must be planted in a short timeframe to achieve maximum yield. Farmers seeking to expand their cropland must do it without expanding the duration of planting beyond the optimum time period. Because farmers find it more efficient to use a wider planter instead of adding another planter and operator, planter manufacturers have expanded row crop planter widths. However, one undesired condition that gets worse as planter width increases is overlap.

Overlap occurs each time passes of the planter intersect (FIG. 1). Wider planters produce greater overlap because all rows are planting whenever the planter is moving and row units are engaged with the soil. Farmers experience economic loss in overlap areas because seed is wasted and yield is reduced compared to non-overlap areas. Essentially, overlap areas are planted twice or more depending on the number of intersecting passes. Extra plants in overlap areas take soil nutrients and moisture from the intended plants, which results in reduced yield compared to non-overlap areas. Farmers contend with these conditions at end rows, point rows and waterways.

Electric actuated drill shaft clutches are recognized as the first device to reduce overlap on row crop planters. These clutches turn groups or sections of seeding units (called rows) on and off. The planter operator manually turns these clutches on and off when the planter section intersects another pass (FIG. 2) thereby reducing overlap.

Electric drill shaft clutches turn rows on and off by controlling a section of the drill shaft. The drill shaft spans across the planter toolbar and rotates at a speed proportional to the speed of the planter. Row units, each containing a seed meter device, are attached to the planter toolbar. The seed meter of each row is mechanically connected (commonly with a chain) to the drill shaft. Each drill shaft section turns a bank of rows on and off at the same time. The electric clutch turns seeding on and off by mechanically engaging and disengaging the drill shaft section to the planter transmission. Smaller width planters are typically made with one drill shaft section. Larger width planters are commonly made with two to four drill shaft sections to allow for planter folding. Each drill shaft section is fitted with a drill shaft clutch.

Another prior art control apparatus is a pneumatic actuated sprocket clutch that controls each row independently. Pneumatic actuated clutches are electrically controlled by an electric over air valve. The drill shaft must be removed for sprocket clutch installation, repair or replacement.

Electrical current requirements of the electric over air valve are much less compared to an electric drill shaft clutch. Another advantage of sprocket clutches over drill shaft clutches is that the planter can be subdivided into more sections without creating more drill shaft sections. This is beneficial for retrofit installations.

Another prior art apparatus is a pneumatic actuated clutch mounted outside the row unit at the seed meter input shaft. The advantage of this over the sprocket clutch is that installation does not require removal of the drill shaft. A big disadvantage is that the clutch is exposed to flying debris from planter lift wheels.

Initially the planter operator manually turned all the aforementioned clutches or planter sections on and off manually. In practice, most operators find it difficult to do this accurately because the planter is moving and there are other machine functions to monitor and control.

It is known to use an electronic control and GPS system that automatically controls all the aforementioned clutches by mapping planted field areas. The system automatically shuts off clutched planter sections when the sections encounter a planted area. Sections are automatically turned on when they encounter an unplanted area. This represents an improvement in that overlap is consistently minimized and the operator can pay more attention to other machine functions at pass intersections.

Several attempts at controlling pneumatic seed meters are known. U.S. Pat. No. 4,872,785 discloses a shut-off means for air-actuated planter, which includes a butterfly valve located within the air manifold of the planter unit, which is connected to a rotational means further connected to a solenoid. When the butterfly valve is open, air is allowed into the meter, enabling the rotating seed disc to pick up and hold individual seeds in perforated seed pockets until the seed exits the air chamber. Once out of the air chamber, the seed falls off the disc, into the soil. When closed, the butterfly valve blocks the flow of air to the seed meter, which causes all seed held on the disc to fall off and prevents the disc from picking up new seed. When the butterfly valve reopens, the seed disc has to rotate the equivalent of 9-12 feet of planter travel before it starts dispensing seed into the soil again. Turning on air supply 9-12 feet before encountering unplanted area compensates for the delay, but many times is not practical. Making sharp turns on end rows or starting in a corner are a few examples where a 9-12 foot "head start" is not practical.

U.S. Pat. Nos. 4,091,964 and 4,241,849 discloses an air cut-off pad for an air planter, however it does not disclose a pad controlled in any variable way.

U.S. Pat. No. 5,431,117 discloses a seed drum row shutoff for a planter. This patent does not disclose any shut-off means for a rotating seed disc with perforated seed pockets.

SUMMARY OF THE INVENTION

The present invention consists of control apparatus for controlling the planting of seed by a pneumatic seed meter. A control element is actuated to either disrupt the pressure differential across an area of a seed disc of the seed meter to cause seed to be released from the seed disc to prevent planting by the seed meter or, alternatively, to maintain the pressure differential across the seed disc so that seed is held on the seed disc until it is released for planting by the seed meter.

In a preferred embodiment, the control element is moved by the actuator into effective sealing contact with an area of the seed disc to release seed before it passes to the area where it is released for planting. One such embodiment consists of a pad that is moved into contact with the seed disc. Another embodiment consists of a wheel that is moved into contact with the seed disc and may rotate alongside the rotating seed disc. Yet another embodiment consists of an enclosure having an open side that is closed upon contact with the seed disc to disrupt the pneumatic pressure differential.

In an alternative embodiment, an enclosure is in permanent sealing contact with the seed disc but has a valve that is operable by an actuator to disrupt the pneumatic pressure differential.

DETAILED DESCRIPTION OF PREFERRED EMBODIMENTS

The present invention is adapted for use with pneumatic seed meters that are in common use on seed planters. Embodiments of the present invention may be incorporated in seed meters by the original manufacturer or may be added as a retrofit to existing seed meters. The various embodiments allow precise control of the planting and non-planting of seed by individual seed meters of planters having multiple seed meters.

A variety of electrical control apparatus exist in the market that can be adapted for the control of embodiments of the present invention. In a preferred embodiment, a SeedCommand™ controller from Ag Leader Technology (Ames, Iowa) is connected through an auxiliary input module and clutch control module (also available from Ag Leader Technology) to control the apparatus for interrupting the planting of seed by a seed planter.

EXAMPLE 1

Figure 1:
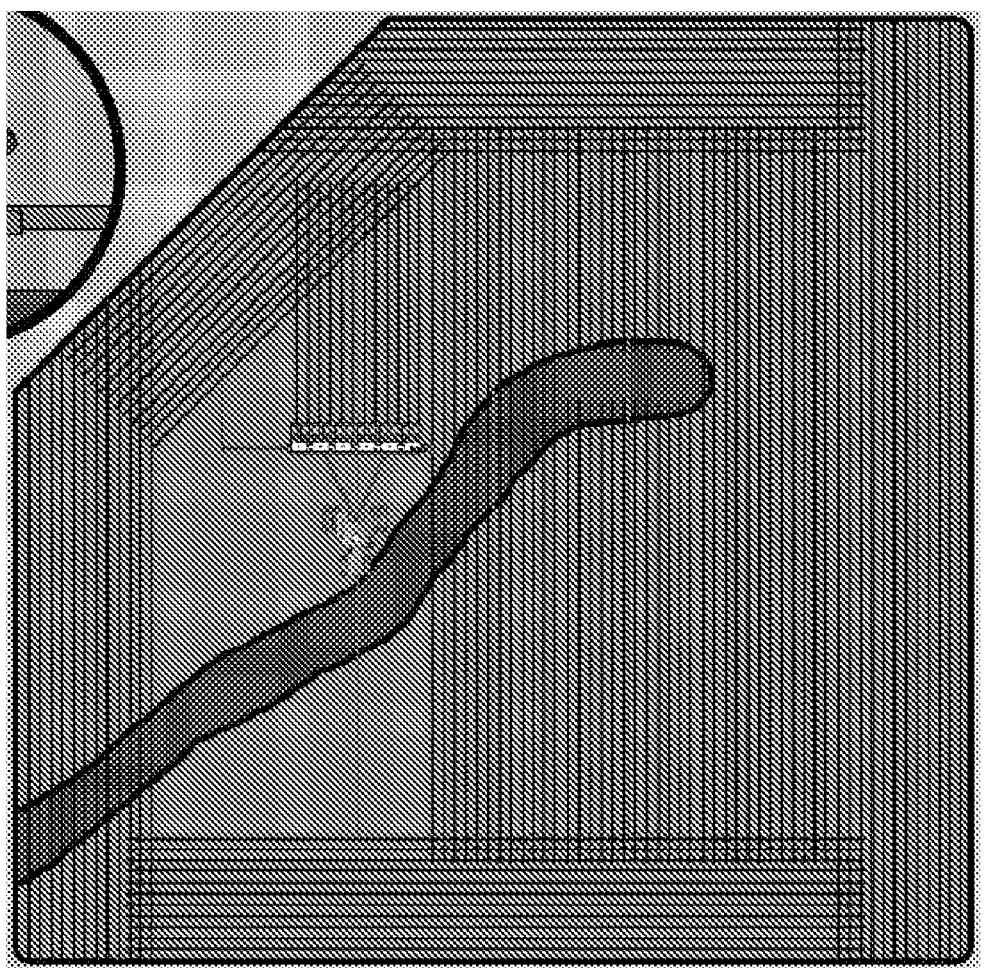
FIG. 1 is a schematic diagram showing overlap of planting using a planter without control of individual row units.
Figure 2:
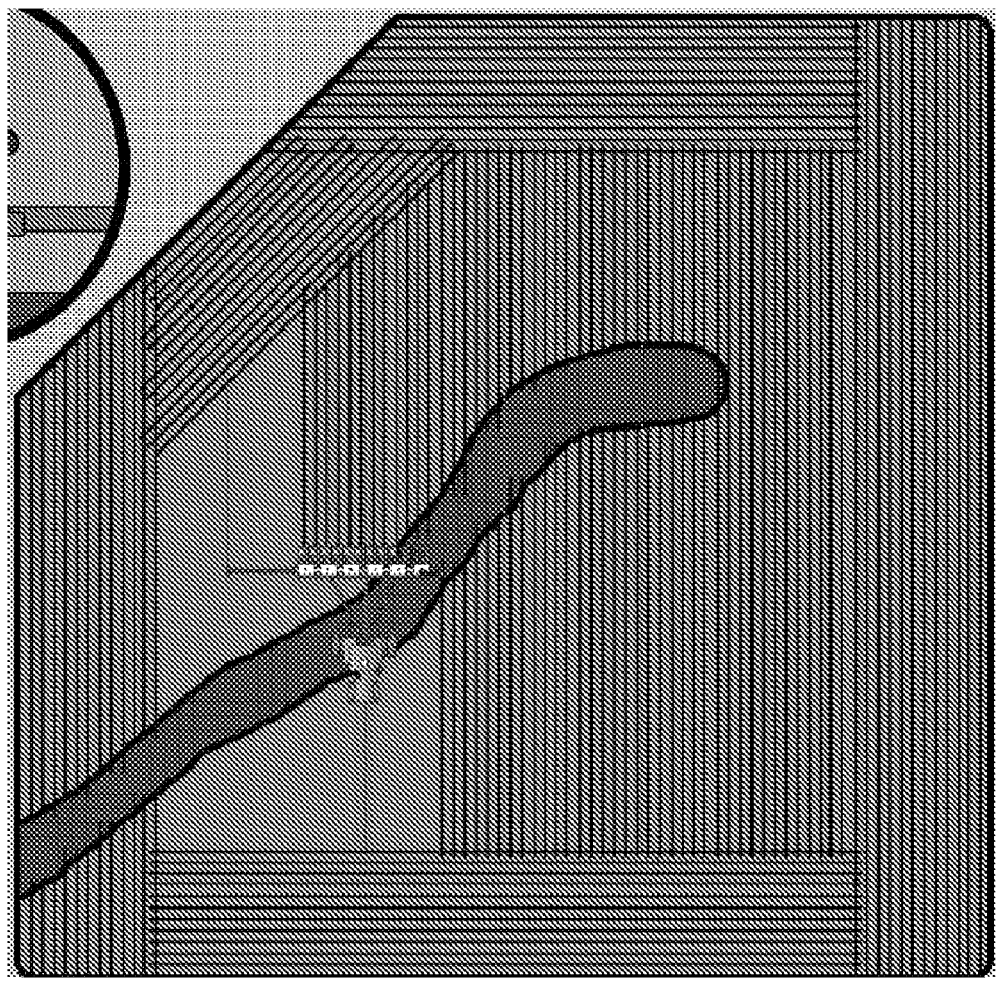
FIG. 2 is a schematic diagram showing the reduction in overlap achieved with clutches associated with groups of row units.
Figure 3:
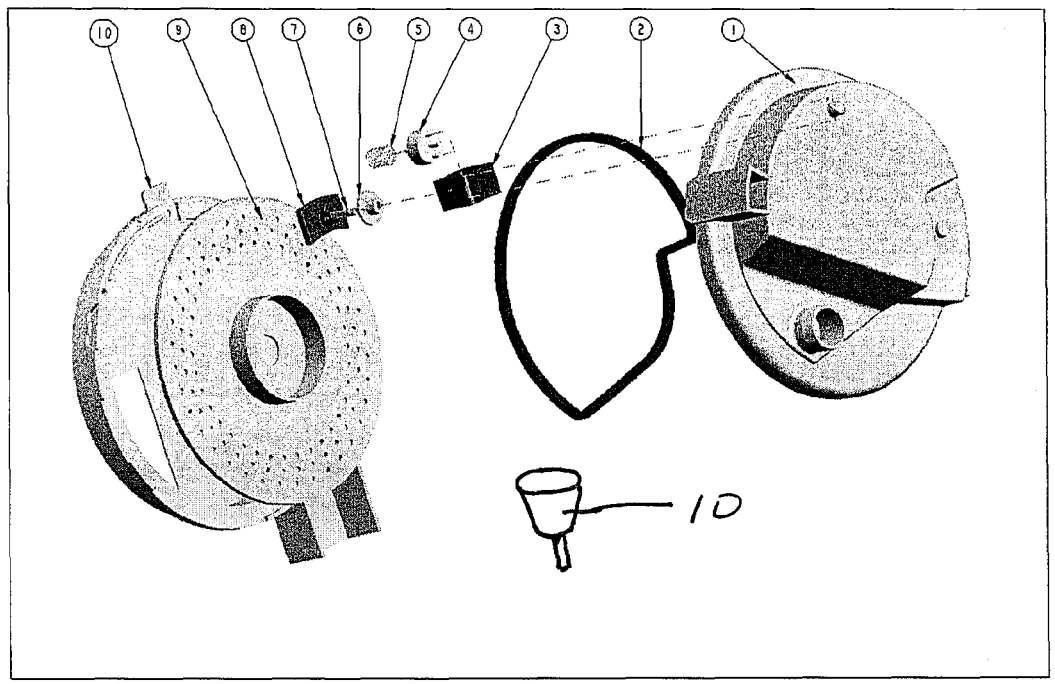
FIG. 3 is an exploded perspective view of an embodiment of the present invention.
Figure 4:
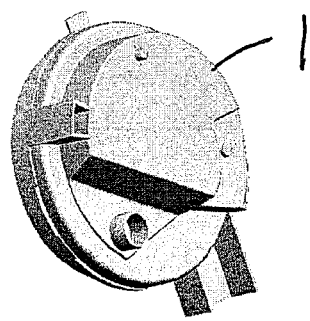
FIG. 4 is a perspective view of the assembly of FIG. 3.

Illustrated in FIGS. 3 and 4 is an example of a vacuum controlled seed meter 1. A pneumatic seed meter disc 9 has perforated seed pockets symmetrically placed around the disc in a concentric pattern. One side of the disc 9 (called the seed side) rotates through a supply of seed at the bottom of the disc 9. Either positive air pressure or a vacuum creates a pressure differential across the disc 9 that causes each seed pocket in the disc 9 to pick up and hold a seed against the disc 9 until it rotates outside of the air chamber. Once outside the air chamber, the disc 9 is no longer under a pressure differential, which causes the seed to fall off the disc 9 into the soil.

The invention is a pad 8 that is held against or away from the side of a pneumatic seed disc 9 by an electric actuator comprising a solenoid 4, a return spring 5 that pulls the pad 8 away from the disk 9 when the solenoid is not actuated, a bushing 6 and a solenoid activation shaft 7. The pad 8 is positioned on the non-seed side of the disc 9. When the pad 8 is held against the disc 9 by actuation of the solenoid 4, it covers one or more seed pockets rotating through the air chamber, carrying seed. This removes or disrupts the pressure differential across those seed pockets causing the seed to fall off the disc 9 before the seed rotates outside the air chamber. The result is that the affected seeds fall back into the seed supply instead of into the soil. When the pad 8 is held away from the disc 9 (when the solenoid 4 is not activated resulting in the return spring 5 retracting the pad 8), the pressure differential is maintained, which allows the disc 9 to carry the seed outside the air chamber and drop it into the soil.

Either an automatic GPS control system or a control system receiving manual input from the operator signals the actuator to hold the pad against the disc (stop seeding state) or hold it away from the disc (seeding state).

Most vacuum seed meters have a removable cover 1 that provides access to the non-seed side of the disc 9. The cover 1 provides quick access to change or service the disc 9. A replacement cover 1 fashioned to mount the pad 8 and actuator provides a very easy installation of the invention in many existing pneumatic planters.

EXAMPLE 2

In an alternative embodiment of the invention, a rotating wheel 10 is positioned in the same location and controlled in the same manner as the pad 8. The wheel 10 is brought into and out of sealing contact with the disc 9 to shut off seeding on pneumatic seed meters 1. A pad 8 may be preferred because it is easier to make one pad 8 that works for all seed discs for a given seed meter than to make one wheel 10 that works for all seed discs. On the other hand, the wheel 10 can be fabricated in a frusto-conical shape and arranged to be in coordinated rolling contact with the disc 9 so as to reduce the friction acting on the wheel 10 and thereby lead to increased life. Accordingly, this embodiment also functions to interrupt and restore planting of seed by disrupting and restoring, respectively, the pressure differential across seed pockets of the seed disc 9.

EXAMPLE 3

Figure 5:
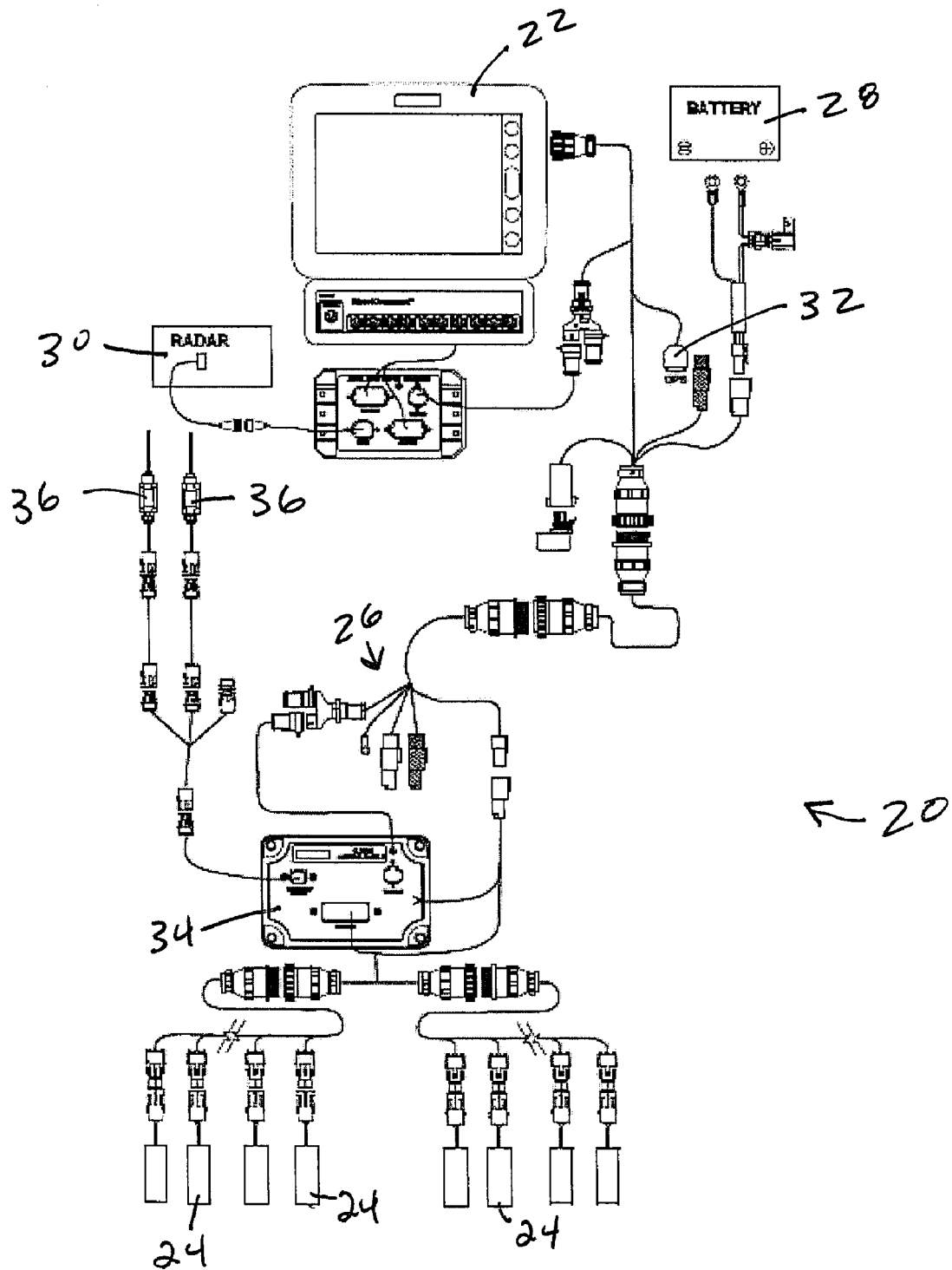
FIG. 5 is schematic diagram of an electrical control circuitry suitable for use with the present invention.

An embodiment of a control apparatus for the present invention is illustrated in FIG. 5, generally at 20. The control apparatus includes a digital processor-based control module 22 that is interconnected with the plurality of seed shut off devices 24 by a CAN bus, generally at 26. The control apparatus 20 is powered by a battery 28, for example the battery of the prime mover that is pulling the seed planter through an agricultural field. Preferably, a radar module 30 and GPS module 32 are in communication with the control module 22 to provide precise geographical location information to assist in the desired pattern of planting of seed by the seed shut off devices. A CAN control module 34 is used in a manner well known in the art to assist in the control of the seed shut off devices as well as other components of the planter, such as implement switches 36.

EXAMPLE 4

Figure 6:
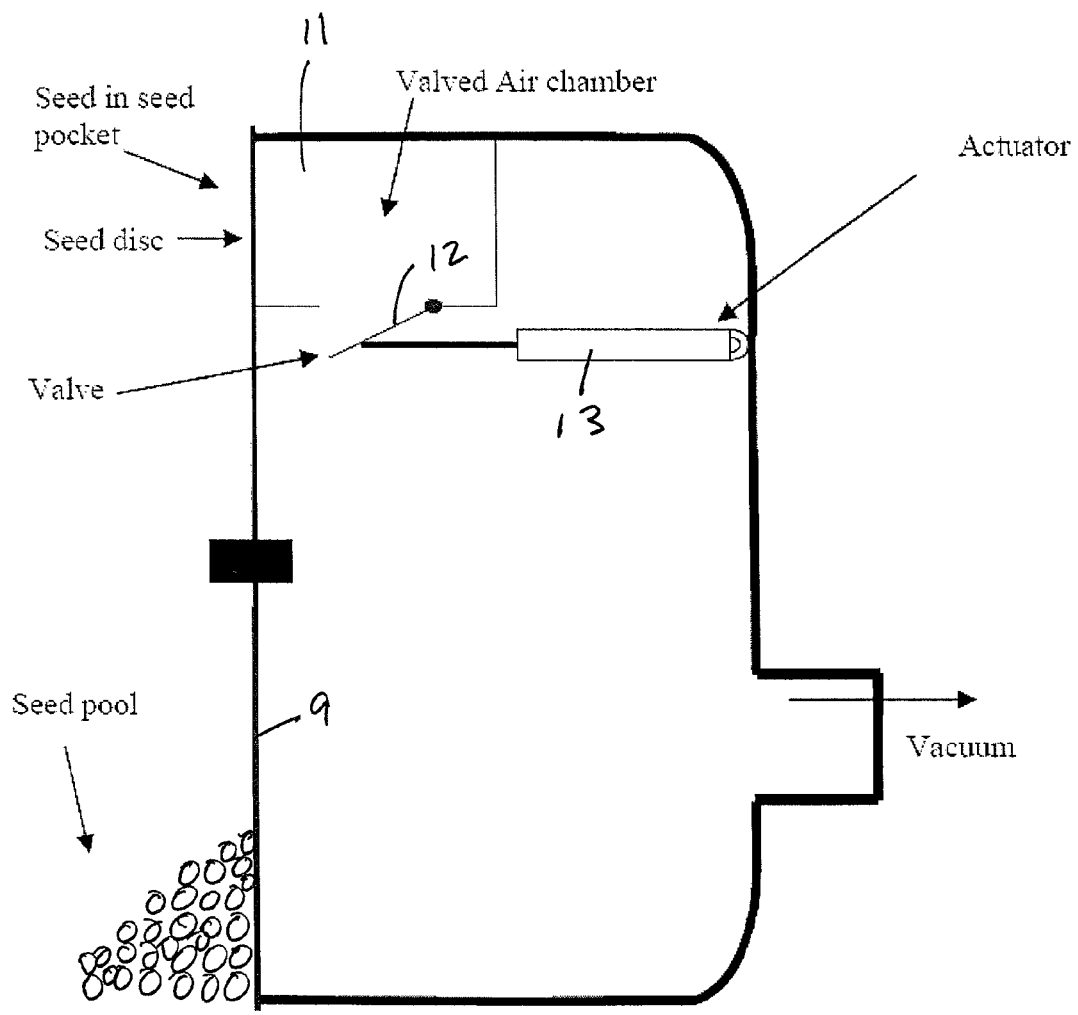
FIG. 6 is a cross-sectional drawing of a planter box showing another alternative embodiment of the present invention.

Another alternative embodiment of the present invention is illustrated in FIG. 6. The pneumatic seed meter 1 includes a valved air chamber 11 positioned adjacent an upper section of the seed disc 9 so that the seed pockets of the seed disc 9 will pass the chamber 11 as the seed disc 9 rotates. The bottom of the chamber 11 includes a valve 12 that is opened and closed in response to an actuator 13. When the actuator 13 holds the valve 12 closed, the chamber 11 disrupts the pressure differential on the seed pockets of the disc 9 in the area of the chamber 11 and no seed is provided for planting. In a preferred embodiment, the actuator 13 is an electrically controlled actuator. When the actuator 13 is moved to open the valve 12, the chamber is restored to the pressure differential condition and seed is again provided for planting. This embodiment again functions to interrupt and restore planting of seed by removing and restoring the pressure differential across seed pockets of the seed disc 9.

EXAMPLE 5

Figure 7:
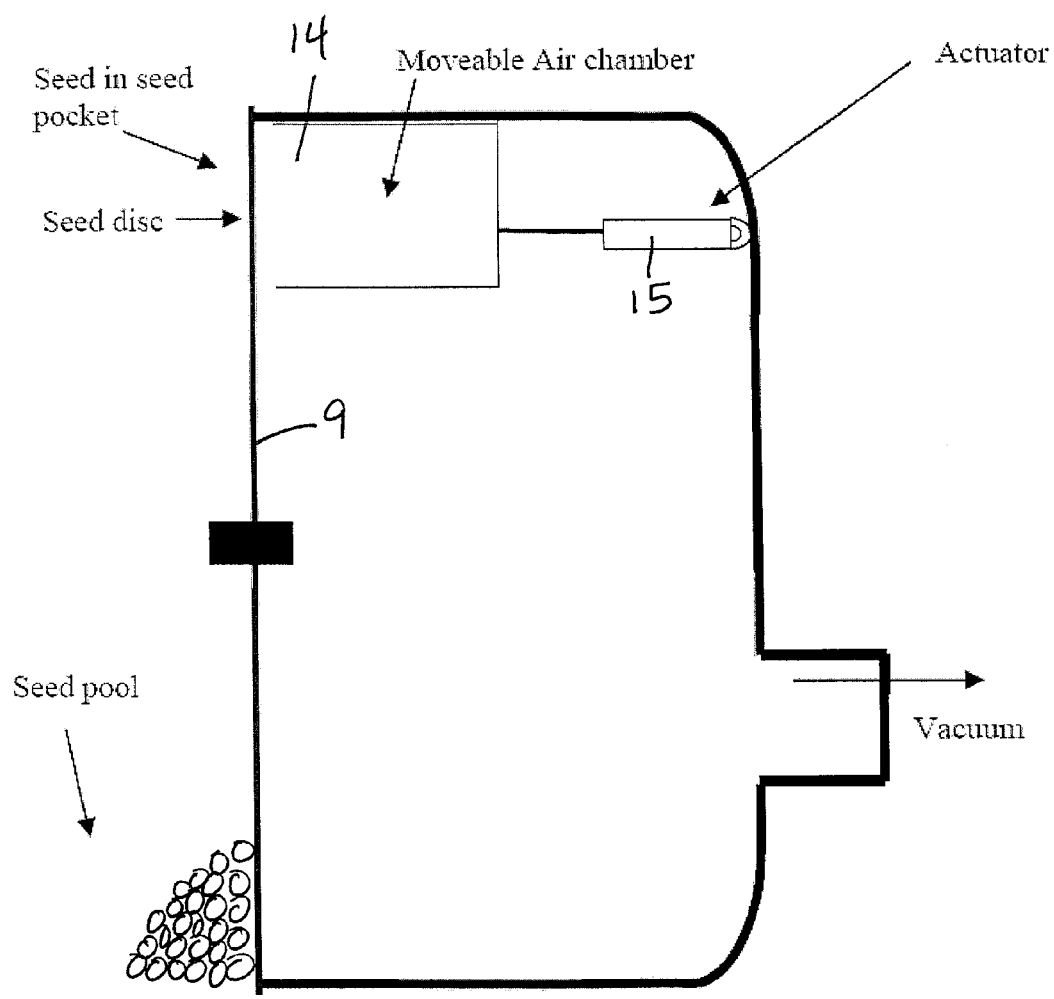
FIG. 7 is a cross-sectional drawing of a planter box showing yet another alternative embodiment of the present invention.

Yet another alternative embodiment of the present invention is illustrated in FIG. 7. The pneumatic seed meter 1 is provided with a moveable air chamber 14 that is enclosed on all sides except for the side facing the seed disc 9, which is open. The moveable air chamber 14 is positioned adjacent an upper section of the seed disc 9 where the seed pockets of the seed disc 9 will be carried past the moveable air chamber 14. An actuator 15 is controlled to move the moveable air chamber into and out of sealing contact engagement with the seed disc 9 to effectively close and open, respectively, the chamber 14. Accordingly, the chamber 14 removes the pressure differential at the seed pockets in the area of the chamber 14 when the actuator 15 holds the chamber 14 in sealing engagement with low pressure side of the seed disc 9 and no seed is provided for planting. The pressure differential is restored when the actuator 15 is controlled to move the chamber 14 out of engagement with the seed disc 9 and seed is again provided for planting. In a preferred embodiment, the actuator 15 is an electrically controlled actuator. This embodiment also functions to interrupt and restore planting of seed by removing and restoring the pressure differential across seed pockets of the seed disc 9.

The current invention uses these features to provide the following advantages: (1) This invention installs much faster than other clutch prior art. Installation labor costs are reduced and resellers can sell and retrofit this device to more planters within a given timeframe; (2) since this invention doesn't transfer power like the clutch prior art, components of the invention are significantly less costly than clutches; (3) because the invention is more affordable than clutches, more end users will experience the benefit of automatic seeding control; and (4) since it is inside the seed meter, it is protected from field debris that might impede or damage the device.

The invention also has a much smaller delay to turn seeding on and off compared to the air-valve disclosed in U.S. Pat. No. 4,872,785.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited.

Those skilled in the art that have the disclosure before them will be able to make modifications and variations therein without departing from the scope of the invention.

We claim:

1. Control apparatus for a pneumatic seed meter that uses a pneumatic pressure differential to hold on a rotating disc seed picked up from a seed reservoir and release them at a later point for planting, comprising:
   (a) a control element having a sealing face and positioned radially of the rotating disc between the seed reservoir and the later point for planting;
   (b) an actuator for moving the control element into and out of sealing engagement with the rotating disc; and
   (c) control circuitry connected to the actuator to cause the actuator to selectively move the control element into and out of sealing contact with the rotating disc to eliminate the pressure differential and release seed from the disc in the area of the sealing face of the control element so that the seed is not planted by the seed meter.

2. Control apparatus as defined in claim 1, wherein the control element comprises a pad.

3. Control apparatus as defined in claim 1, wherein the control element comprises a wheel.

4. Control apparatus as defined in claim 1, wherein the control element comprises an enclosure having an open face that is closed upon sealing contact with the disc.

5. Control apparatus as defined in claim 1, wherein the pneumatic pressure is higher on the side of the disc opposite the control element than on the side of the disc brought into contact with the control element.

6. Control apparatus as defined in claim 1, a spring element biasing the control element out of sealing engagement with the rotating disc.

\* \* \* \* \*